(12) United States Patent  (10) Patent No.: US 11,393,504 B2
Ojima  (45) Date of Patent: Jul. 19, 2022

(54) MAGNETIC TAPE DEVICE, MAGNETIC RECORDING DEVICE, AND TAPE LIFTING METHOD FOR MAGNETIC TAPE DEVICE

(71) Applicant: NEC Platforms, Ltd., Kawasaki (JP)

(72) Inventor: Kenichi Ojima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 449 days.

(21) Appl. No.: 16/479,639

(22) PCT Filed: Dec. 25, 2017

(86) PCT No.: PCT/JP2017/046331
§ 371 (c)(1),
(2) Date: Jul. 22, 2019

(87) PCT Pub. No.: WO2018/142808
PCT Pub. Date: Aug. 9, 2018

(65) Prior Publication Data
US 2021/0366516 A1  Nov. 25, 2021

(30) Foreign Application Priority Data

Feb. 3, 2017  (JP) .............................. JP2017-018124

(51) Int. Cl.
*G11B 5/54*  (2006.01)
*G11B 5/56*  (2006.01)
(Continued)

(52) U.S. Cl.
CPC .......... *G11B 15/444* (2013.01); *G11B 5/4893* (2013.01); *G11B 5/54* (2013.01);
(Continued)

(58) Field of Classification Search
None
See application file for complete search history.

(56) References Cited

U.S. PATENT DOCUMENTS 5,923,494 A * 7/1999 Arisaka ................ G11B 5/5504
6,166,881 A * 12/2000 Anderson ............... G11B 5/41
360/128

(Continued)

FOREIGN PATENT DOCUMENTS

JP  H06-84249 A  3/1994
JP  H08-255326 A  10/1996
(Continued)

OTHER PUBLICATIONS

International Search Report for PCT Application No. PCT/JP2017/046331, dated Mar. 6, 2018.

*Primary Examiner* — Jefferson A Evans
(74) *Attorney, Agent, or Firm* — Sughrue Mion, PLLC (57) ABSTRACT

A magnetic tape device includes: a magnetic head; a head actuator that holds the magnetic head; and a tape lifting mechanism including a lifter arm. The lifter arm comes into contact with the magnetic tape to separate a magnetic tape from the magnetic head. The tape lifting mechanism moves the lifter arm in a push-out direction in conjunction with the head actuator moving in a first direction. The tape lifting mechanism moves the lifter arm in a retreating direction in conjunction with the head actuator moving in a second direction. The lifter arm pushes out the magnetic tape to separate the magnetic tape from the magnetic head, in response to the lifter arm moving in the push-out direction. The lifter arm separates from the magnetic tape to bring the magnetic tape into contact with the magnetic head, in response to the lifter arm moving in the retreating direction.

10 Claims, 10 Drawing Sheets

(51) Int. Cl.
  *G11B 15/48* (2006.01)
  *G11B 15/44* (2006.01)
  *G11B 5/55* (2006.01)
  *G11B 21/22* (2006.01)
  *G11B 5/48* (2006.01)

(52) U.S. Cl.
  CPC .............. *G11B 5/5517* (2013.01); *G11B 5/56* (2013.01); *G11B 15/48* (2013.01); *G11B 21/22* (2013.01)

(56) References Cited

U.S. PATENT DOCUMENTS

| | | | | |
|---|---|---|---|---|
| 7,054,101 | B1 * | 5/2006 | Marion | G11B 5/00821 |
| | | | | 360/261 |
| 7,859,786 | B2 * | 12/2010 | Saliba | G11B 5/584 |
| | | | | 360/71 |
| 8,724,247 | B2 * | 5/2014 | Poorman | G11B 5/584 |
| | | | | 360/75 |
| 2006/0175452 | A1 * | 8/2006 | Biskeborn | G11B 15/56 |
| | | | | 242/346 |
| 2006/0256465 | A1 * | 11/2006 | Biskeborn | G11B 15/60 |
| | | | | 360/71 |
| 2008/0259490 | A1 * | 10/2008 | Fujita | G11B 15/12 |
| 2009/0001206 | A1 * | 1/2009 | Yeas | G11B 15/60 |
| | | | | 242/342 |
| 2009/0027806 | A1 * | 1/2009 | Biskeborn | G11B 5/41 |
| | | | | 360/128 |
| 2009/0225462 | A1 | 9/2009 | Ojima | |
| 2013/0301159 | A1 * | 11/2013 | Mori | G11B 23/049 |
| | | | | 360/96.1 |
| 2015/0043105 | A1 | 2/2015 | Ashikawa | |
| 2017/0178679 | A1 * | 6/2017 | Ojima | G11B 15/43 |
| 2021/0134324 | A1 * | 5/2021 | Biskeborn | G11B 5/00817 |

FOREIGN PATENT DOCUMENTS

| | | |
|---|---|---|
| JP | 2003-036512 A | 2/2003 |
| JP | 2004-152352 A | 5/2004 |
| JP | 2005-339603 A | 12/2005 |
| JP | 2008-287850 A | 11/2008 |
| JP | 2009-211754 A | 9/2009 |
| WO | 2013/168621 A1 | 11/2013 |

* cited by examiner

MAGNETIC TAPE DEVICE, MAGNETIC RECORDING DEVICE, AND TAPE LIFTING METHOD FOR MAGNETIC TAPE DEVICE

This application is a National Stage Entry of PCT/JP2017/046331 filed on Dec. 25, 2017, which claims priority from Japanese Patent Application 2017-018124 filed on Feb. 3, 2017, the contents of all of which are incorporated herein by reference, in their entirety.

TECHNICAL FIELD

The present invention relates to a magnetic tape device, a magnetic recording device, and a tape lifting method for a magnetic tape device.

BACKGROUND ART

A magnetic tape device performs recording and reproducing of data while a magnetic tape is traveling. At a time of data queuing or rewinding, the magnetic tape is caused to travel at a speed higher than those at the time of performing recording or reproducing. Therefore there is a concern over wear of a recording head due to repetitive high-speed traveling.

In such a magnetic tape device, the magnetic tape becomes attached to the magnetic head once the magnetic tape is stopped due to a temporary stop or the like and a predetermined length of time has elapsed. As a result, when the magnetic tape needs to travel next time, there is a possibility that it may be impossible to resume traveling. In order to avoid these problems, in the above magnetic tape device, the magnetic tape in contact with the magnetic head is lifted from the magnetic head at times of high-speed traveling, and stopping of recording or reproducing, to thereby bring the magnetic tape into a state of non-contact with the magnetic head.

For example, in a magnetic tape device disclosed in Patent Document 1, there is provided a release unit that releases the contact between a magnetic tape and a magnetic head. In a case where an abnormality is detected by an abnormality detection unit while the magnetic tape is traveling, the contact between the magnetic tape and the magnetic head is forcibly released.

PRIOR ART DOCUMENTS

Patent Documents

[Patent Document 1] Japanese Unexamined Patent Application, First Publication No. 2009-211754
[Patent Document 2] Japanese Unexamined Patent Application, First Publication No. 2004-152352
[Patent Document 3] Japanese Unexamined Patent Application, First Publication No. 2003-036512
[Patent Document 4] Japanese Unexamined Patent Application, First Publication No. H06-084249

DISCLOSURE OF THE INVENTION

Problem to be Solved by the Invention

However, in the technique disclosed in Patent Document 1, it is necessary to provide a driving unit separate from a release unit for releasing the contact between the magnetic tape and the magnetic head. For this reason, there was a possibility that the configuration may become complex and the entire device may become large.

Also, as techniques for providing a separate driving unit, configurations related to Patent Documents 2 to 4 have also been provided. In any of these configurations, it is necessary to newly add configurations such as a movable part and a rotating part. For this reason, the problem of complex configuration mentioned above cannot be solved.

The present invention has been made in view of the above circumstances. An exemplary object of the present invention is to provide a magnetic tape device, a magnetic recording device, and a tape lifting method capable of lifting a magnetic tape with a simple configuration.

Means for Solving the Problem

A magnetic tape device according to a first exemplary aspect of the present invention includes: a magnetic head that comes into contact with a magnetic tape that travels; a head actuator that holds the magnetic head and moves in a first direction and a second direction; and a tape lifting mechanism that includes a lifter arm, the lifter arm coming into contact with the magnetic tape to separate the magnetic tape from the magnetic head, the tape lifting mechanism moving the lifter arm in a push-out direction in conjunction with the head actuator moving in the first direction, the tape lifting mechanism moving the lifter arm in a retreating direction in conjunction with the head actuator moving in the second direction, the retreating direction being opposite to the push-out direction. The lifter arm pushes out the magnetic tape to separate the magnetic tape from the magnetic head, in response to the lifter arm moving in the push-out direction. The lifter arm separates from the magnetic tape to bring the magnetic tape into contact with the magnetic head, in response to the lifter arm moving in the retreating direction.

A tape lifting method according to a second exemplary aspect of the present invention is a tape lifting method for a magnetic tape device, the magnetic tape device including a magnetic head that comes into contact with a magnetic tape that travels, a head actuator that holds the magnetic head and moves in a first direction and a second direction, and a tape lifting mechanism including a lifter arm that comes into contact with the magnetic tape to separate the magnetic tape from the magnetic head. The tape lifting method includes: moving the lifter arm in a push-out direction in conjunction with the head actuator moving in the first direction; separating the magnetic tape from the magnetic head by the lifter arm pushing out the magnetic tape in response to the lifter arm moving in the push-out direction; moving the lifter arm in a retreating direction in conjunction with the head actuator moving in the second direction, the retreating direction being opposite to the push-out direction; bringing the magnetic tape into contact with the magnetic head by the lifter arm separating from the magnetic tape in response to the lifter arm moving in the retreating direction.

Effect of the Invention

According to an exemplary embodiment of the present invention, a lifter arm that separates a magnetic tape from a magnetic head can be driven by means of power of a head actuator of the related art. As a result, wear of the magnetic tape can be effectively suppressed without causing complication in the configuration.

EMBODIMENTS FOR CARRYING OUT THE INVENTION

First Exemplary Embodiment

A first exemplary embodiment of the present invention will be described with reference to FIG. 1A to FIG. 1C.

Figure 1A:
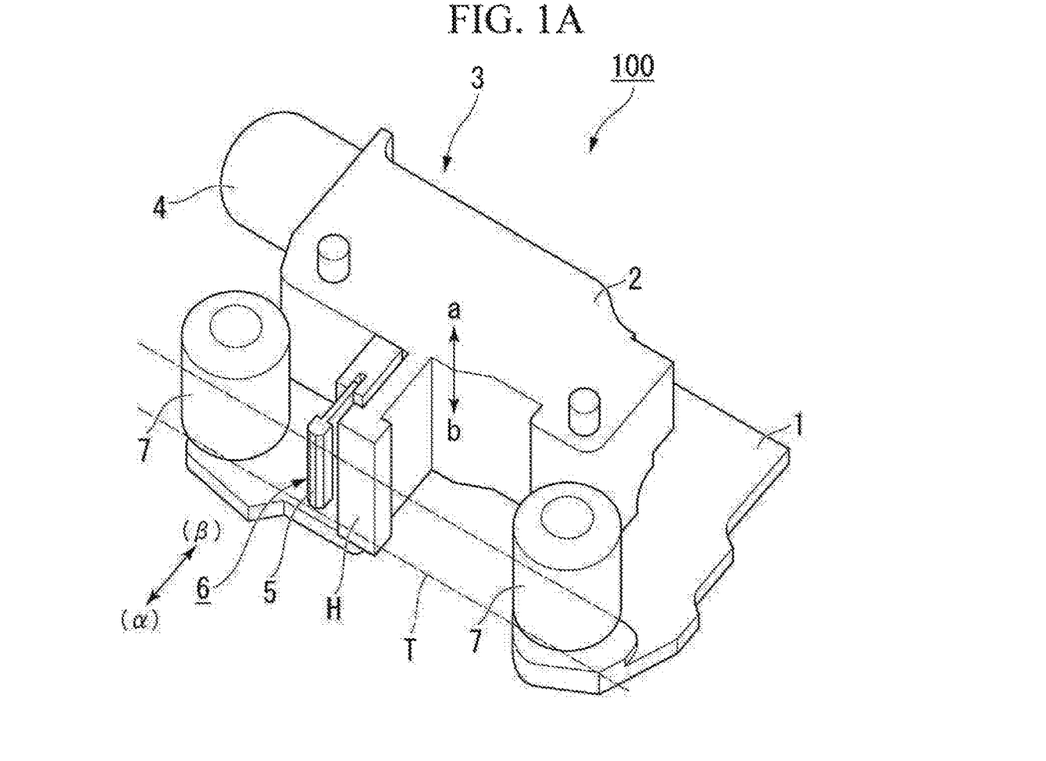
FIG. 1A is a schematic configuration diagram showing an entire magnetic tape device according to a first exemplary embodiment of the present invention.

FIG. 1A is a schematic configuration diagram of a configuration of a magnetic tape device 100 according to the first exemplary embodiment of the present invention. The magnetic tape device 100 has a base 1.

On the base 1 there is provided a head actuator 3 having an elevator member 2. The elevator member 2 holds a magnetic head H that comes into contact with a magnetic tape T, and moves the magnetic head H in width directions (in directions of arrows a-b) of the magnetic tape T.

The head actuator 3 lowers the magnetic head H installed on the elevator member 2 in the direction of the arrow b or raises it in the direction of the arrow a by driving of a lifting motor 4.

When the magnetic head H is at a raised position in the direction of the arrow a, the head actuator 3 causes the magnetic head H to perform processing of reading from or writing to the magnetic tape T, and at this time, the magnetic head H is moved upward and downward minutely in order to position the magnetic head H with respect to a recording track on the magnetic tape T.

The elevator member 2 of the head actuator 3 includes a tape lifting mechanism 6. The tape lifting mechanism 6 has a lifter arm 5 that comes into contact with a surface of the magnetic tape T to separate the magnetic tape T from the magnetic head H. The tape lifting mechanism 6 moves the lifter arm 5 in conjunction with the movement of the head actuator 3.

Figure 1B:
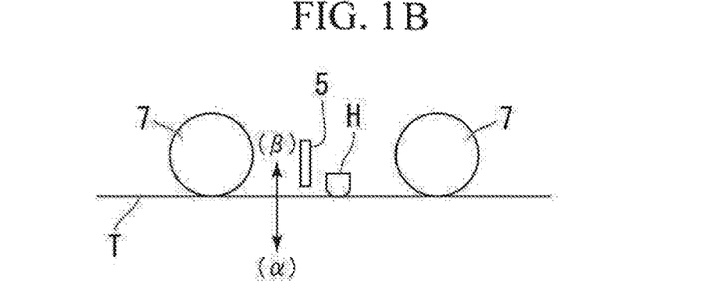
FIG. 1B is a diagram showing a state where a magnetic head of the magnetic tape device shown in FIG. 1A is in contact with a magnetic tape.

As shown in FIG. 1B, the tape lifting mechanism 6 causes the lifter arm 5 to retreat to the rear side of the magnetic head H (in the direction of the arrow (β)) in the state where the elevator member 2 of the head actuator 3 has moved in the upward direction (in the direction of the arrow a).

In this state, the lifter arm 5 is separated from the magnetic tape T. Therefore, the magnetic tape T can be brought into contact with the magnetic head H, and the magnetic head H can read from and write to the magnetic tape T.

That is to say, in the head actuator 3, when the magnetic head H is at the raised position in the direction of the arrow a, the magnetic head H is in a reading/writing range where it reads from or writes to the magnetic tape T. In this reading/writing range, it is possible to perform the operation of moving the magnetic head H upward and downward in order to minutely position the magnetic head H with respect to the recording track on the magnetic tape T.

Figure 1C:
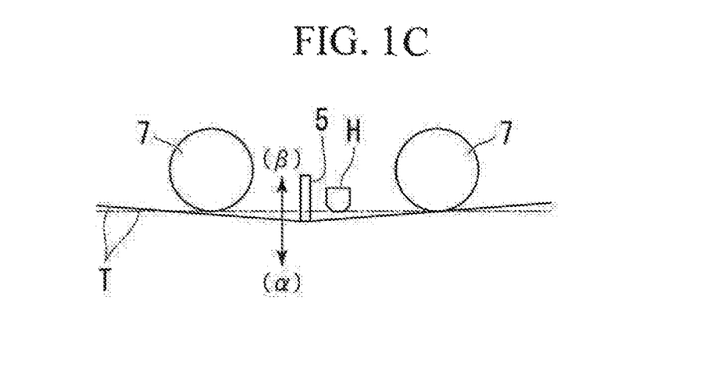
FIG. 1C is a diagram showing a state where the magnetic head of the magnetic tape device shown in FIG. 1A has separated from the magnetic tape.

Moreover, as shown in FIG. 1C, the tape lifting mechanism 6 can cause the lifter arm 5 to move forward of (in the direction of the arrow (α)) the magnetic head H when the elevator member 2 of the head actuator 3 has moved in the downward direction (in the direction of the arrow b) by driving of the lifting motor 4.

As a result, the lifter arm 5 can push out the magnetic tape T to separate the magnetic tape T from the magnetic head H.

As the tape lifting mechanism 6, for example, a mechanism using a rack and a pinion is used.

Further, FIG. 1A to FIG. 1C show guide rollers 7 for guiding to the magnetic head H.

As described above in detail, according to the magnetic tape device 100 of the first exemplary embodiment of the present invention, the power of the head actuator 3 of the related art moving in the width directions (the directions of the arrows a-b) of the magnetic tape T, is used to drive the lifter arm 5 to separate the magnetic tape T from the magnetic head H. Therefore, wear of the magnetic tape T can be effectively suppressed without causing complication in the configuration.

Specifically, in the magnetic tape device 100 according to the first exemplary embodiment of the present invention, the lifter arm 5 is moved forward (in the direction of the arrow (α), or the push-out direction) when the head actuator 3 has moved in one direction (in the direction of the arrow b, the first direction, or the downward direction). As a result, it is possible to push out the magnetic tape T to separate the magnetic tape T from the magnetic head H.

Moreover, in the magnetic tape device 100, the lifter arm 5 is retreated to the rear side (in the direction of the arrow (β), or the retreating direction), when the head actuator 3 has moved in the other direction (in the direction of the arrow a, the second direction, or the upward direction) (the "other direction" is the opposite direction of the "one direction"). Therefore, the lifter arm 5 can separate from the magnetic tape T to bring the magnetic tape T into contact with the magnetic head H.

As a result, in the magnetic tape device 100 of the first exemplary embodiment of the present invention, it is possible, without newly providing a special mechanism for driving the lifter arm 5, to drive the lifter arm 5 that separates the magnetic tape T from the magnetic head H, using the power of the head actuator 3 of the related art. As a result, wear of the magnetic tape T can be effectively suppressed without causing complication in the configuration.

A tape lifting method including a first step and a second step is applied to the magnetic tape device 100 according to the first exemplary embodiment of the present invention. The first step is a step of moving the head actuator 3 in one direction (in the downward direction), to move the lifter arm 5 forward (in the direction of the arrow (α)) to push out the magnetic tape T and separate the magnetic tape T from the magnetic head H. The second step is a step of moving the head actuator 3 in the other direction (in the upward direction), to retreat the lifter arm 5 backward (in the direction of the arrow (β)) to separate it from the magnetic tape T.

Second Exemplary Embodiment

A second exemplary embodiment of the present invention will be described with reference to FIG. 2 to FIG. 9.

Figure 2:
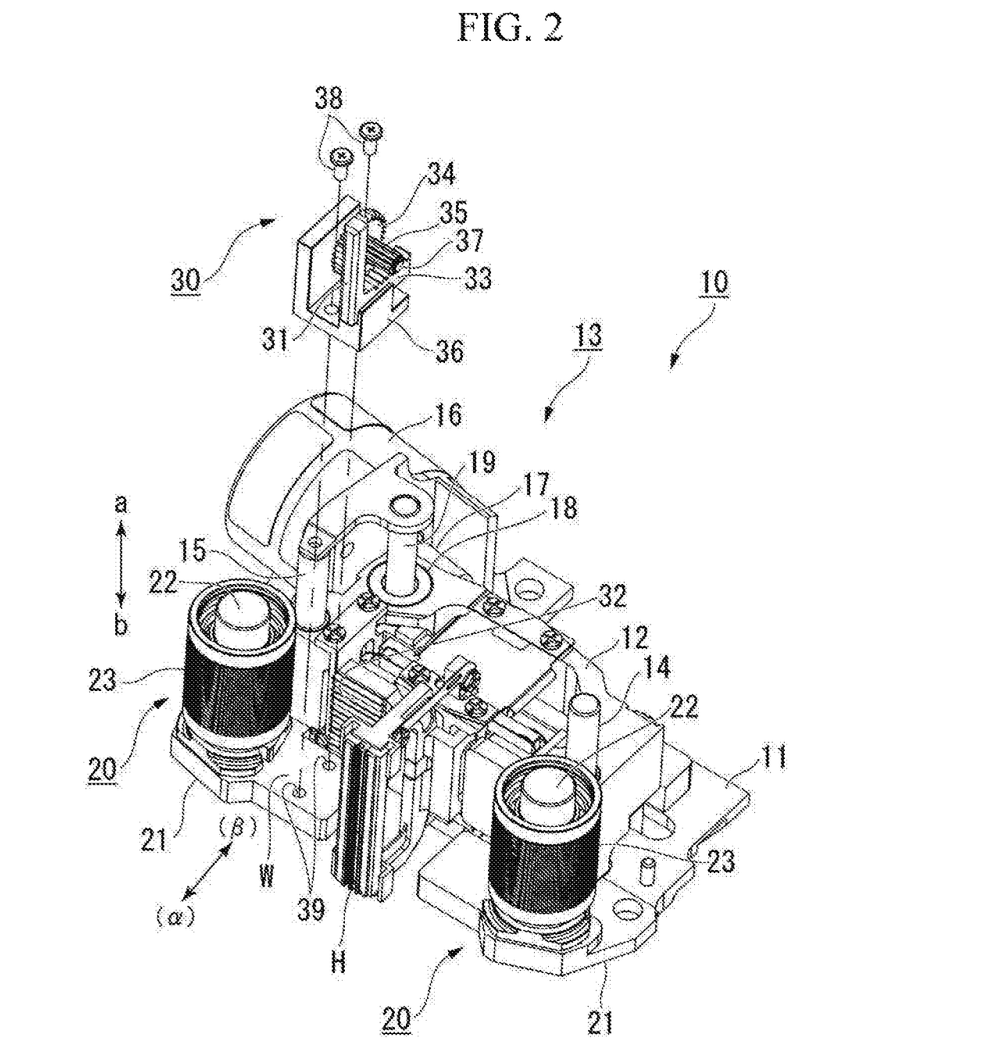
FIG. 2 is a perspective view of a magnetic tape device according to a second exemplary embodiment of the present invention, showing a state where a tape lifting mechanism is disassembled.

FIG. 2 is a schematic configuration diagram of a magnetic tape device 10 according to the second exemplary embodiment of the present invention. The magnetic tape device 10 has a main body base 11.

On the main body base 11 there is provided a head actuator 13 having an elevator member 12. The elevator member 12 holds a magnetic head H that comes into contact with a magnetic tape T, and moves the magnetic head H in width directions (in directions of arrows a-b) of the magnetic tape T which is the upward and downward direction.

On the main body base 11 there are provided two shafts 14 and 15 extending in the upward and downward directions (the directions of the arrows a-b). The elevator member 12 is freely movable upward and downward relative to the main body base 11, through the two shafts 14 and 15. The elevator member 12 is driven by a lifting motor 16 mounted on the main body base 11.

Figure 3:
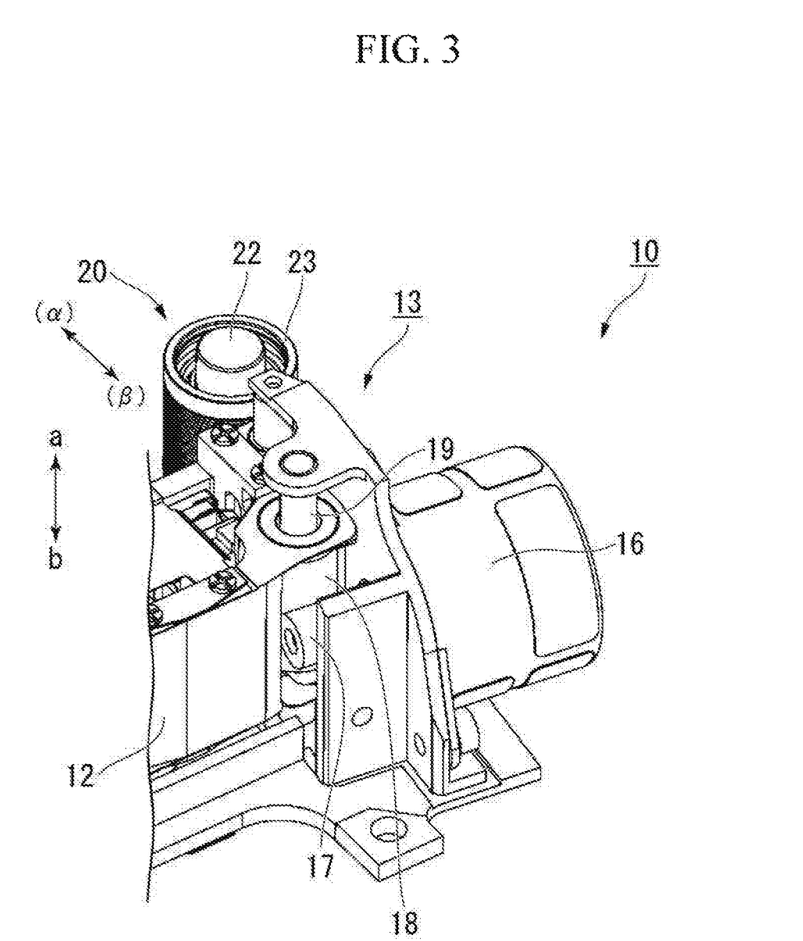
FIG. 3 is a perspective view of a lifting mechanism of an elevator member of FIG. 2 as viewed from a rear side.
Figure 4A:
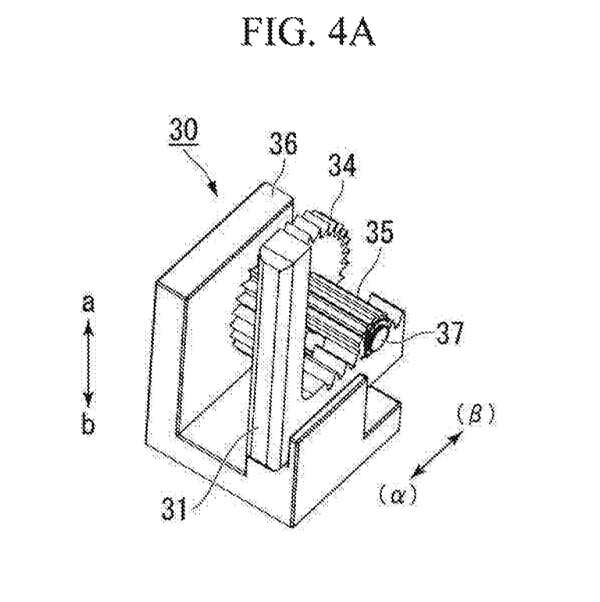
FIG. 4A is a perspective view showing a tape lifting mechanism of the magnetic tape device shown in FIG. 2.
Figure 4B:
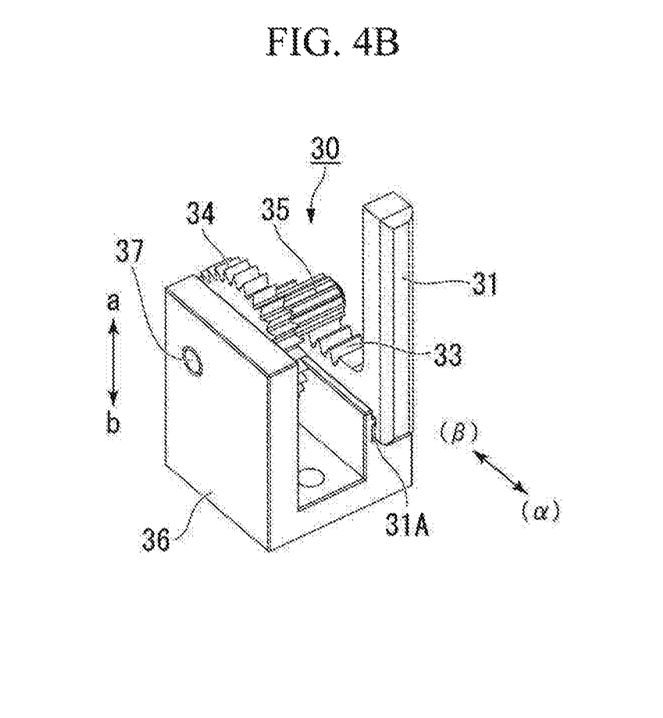
FIG. 4B is a perspective view showing the tape lifting mechanism of the magnetic tape device shown in FIG. 2.

As shown in FIG. 3, power generated by the lifting motor 16 is transmitted to the elevator member 12 through a worm gear 17, a gear and lead screw 18, and a lead screw 19. Thereby, the elevator member 12 is moved upward and downward.

The lead screw 19 is press-fitted and fixed to the main body base 11. An outer diameter part of the lead screw 19 is engaged with the gear and lead screw gear 18 having a gear. The lead screw 19 is axially movable with respect to the gear and lead screw 18. An outer diameter part gear of the gear and lead screw 18 is engaged with the worm gear 17.

The head actuator 13 lowers the magnetic head H installed on the elevator member 12 in the direction of the arrow b or raises it in the direction of the arrow a by driving of the lifting motor 16. By moving the magnetic head H in this manner, the head actuator 13 positions the magnetic head H with respect to the recording track on the magnetic tape T.

To the main body base 11 there are connected two sets of tape guides 20 at an interval. The two sets of tape guides 20 are located on both sides of the magnetic head H. On a supporting member 21 there is installed support shafts 22 that extend vertically. Each tape guide 20 has a guide roller 23 rotatable about a supporting shaft 22. The tape guides 20 guide the magnetic tape T in the length direction through the guide rollers 23.

The tape guides 20 stably support the magnetic tape T by the two guide rollers 23.

On the main body base 11 there is installed a tape lifting mechanism 30.

The tape lifting mechanism 30 is arranged in a free space region W between the magnetic head H and one of the guide rollers 23 (see FIG. 2). The tape lifting mechanism 30 has a lifter arm 31 that comes into contact with a surface of the magnetic tape T to separate the magnetic tape T from the magnetic head H.

Specifically, as shown in FIG. 2, FIG. 4A, FIG. 4B and FIG. 5, the tape lifting mechanism 30 includes a first rack 32, a second rack 33, and pinions (circular gears) 34 and 35. The first rack 32 is fixed to the elevator member 12 of the head actuator 13. The second rack 33 is provided integrally with the lifter arm 31. The pinions 34 and 35 mesh with the first rack 32 and the second rack 33. The first rack 32 and the second rack 33 have teeth that are linearly arranged at equal intervals.

Figure 5:
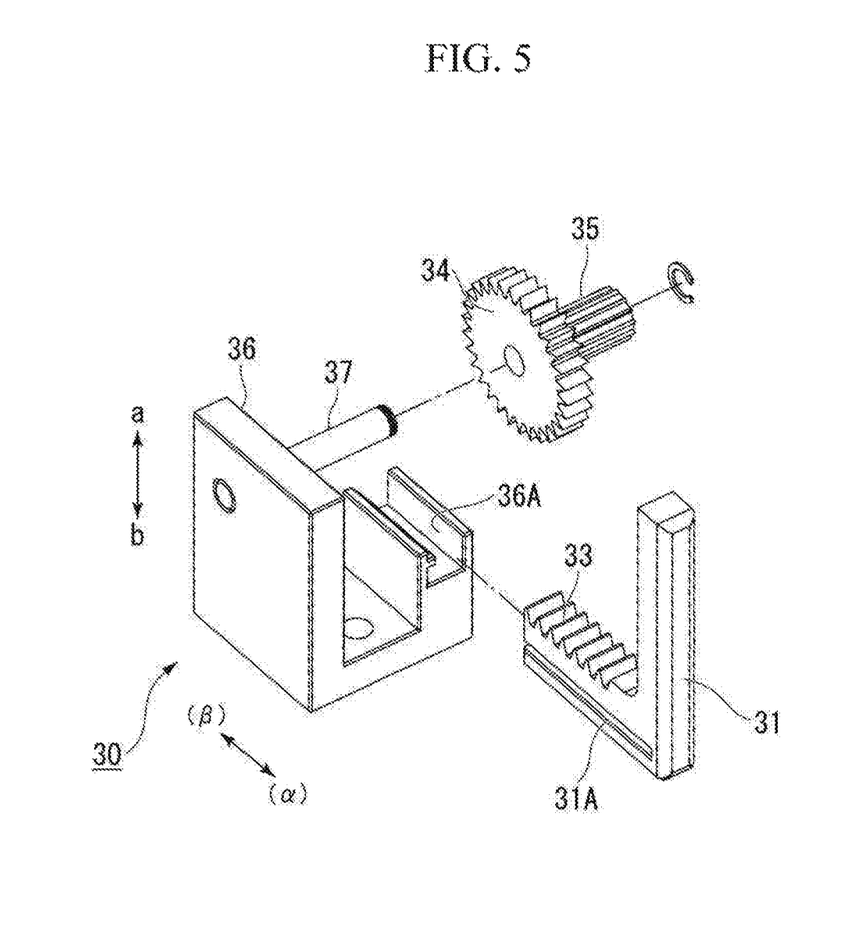
FIG. 5 is an exploded view of the tape lifting mechanism shown in FIG. 4A.

The lifter arm 31 and the second rack 33 are integrated. The lifter arm 31 and the second rack 33 integrally form an L-shaped member.

The lifter arm 31 has an engaged part 31A formed at the lower part thereof. A lifter base 36 is fixed on the main body base 11. The lifter base 36 has a groove 36A having a recessed shape. The lifter arm 31 is slidable in the front-rear direction (in the directions of the arrows (α)-(β)) with respect to the lifter base 36 by engaging the engaged part 31A with the groove 36A. The front-rear direction is substantially orthogonal to the upward and downward direction.

A low friction hard material is used for the lifter arm 31. The lifter arm 31 can slide on the groove 36A of the lifter base 36 with low friction.

The pinions 34 and 35 are supported on the lifter base 36 via a shaft 37 and are rotatable about an axis thereof. By rotating the pinions 34 and 35 integrally about the shaft 37, the driving force of the head actuator 13 is transmitted to the lifter arm 31 via the first rack 32 and the second rack 33.

By intervening the pinions 34 and 35 between the first rack 32 and the second rack 33, the operation of the first rack 32 in the upward and downward directions (the directions of the arrows a-b) is converted into an operation of the second rack 33 in the front-rear directions (the directions of the arrows (α)-(β)).

Figure 8:
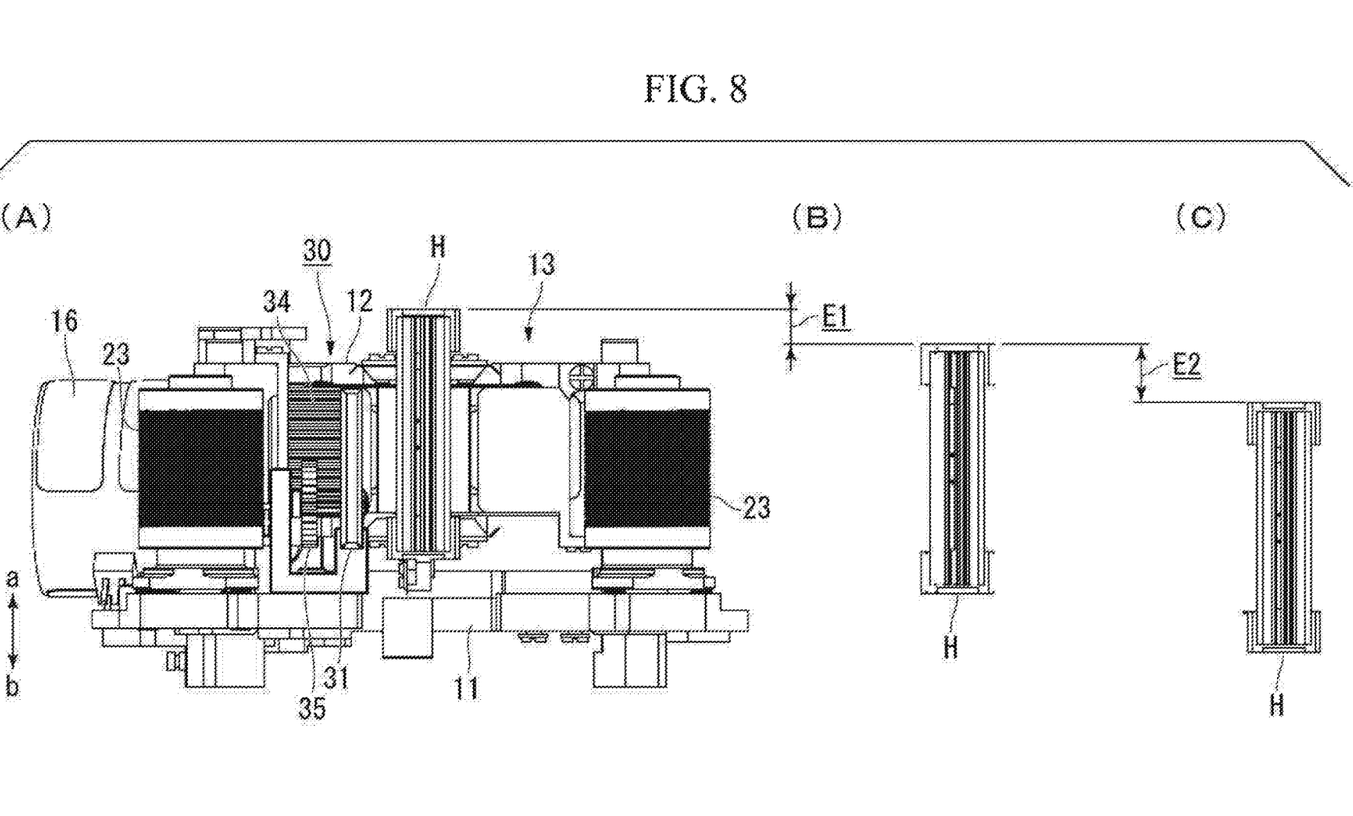
FIG. 8 is a diagram showing positions of the magnetic head of the magnetic tape device according to the second exemplary embodiment.

As shown in FIG. 2 and FIG. 8, the tape lifting mechanism 30 is fixed on the main body base 11 by fastening the lifter base 36 to the main body base 11 via screws 38 and screw holes 39.

The shaft 37 of the pinions 34 and 35 is installed in a positional relationship orthogonal to the shafts 14 and 15. The shafts 14 and 15 support the elevator member 12 so as to be movable in the upward-downward directions.

FIG. 8 is a diagram showing positions of the magnetic head H of the magnetic tape device 10 according to the second exemplary embodiment. The portion (A) of FIG. 8 shows a case where the magnetic head H is at an upper position. The portion (B) of FIG. 8 shows a case where the magnetic head H is at an intermediate position. The portion (C) of FIG. 8 shows a case where the magnetic head H is at a lower position.

Figure 9:
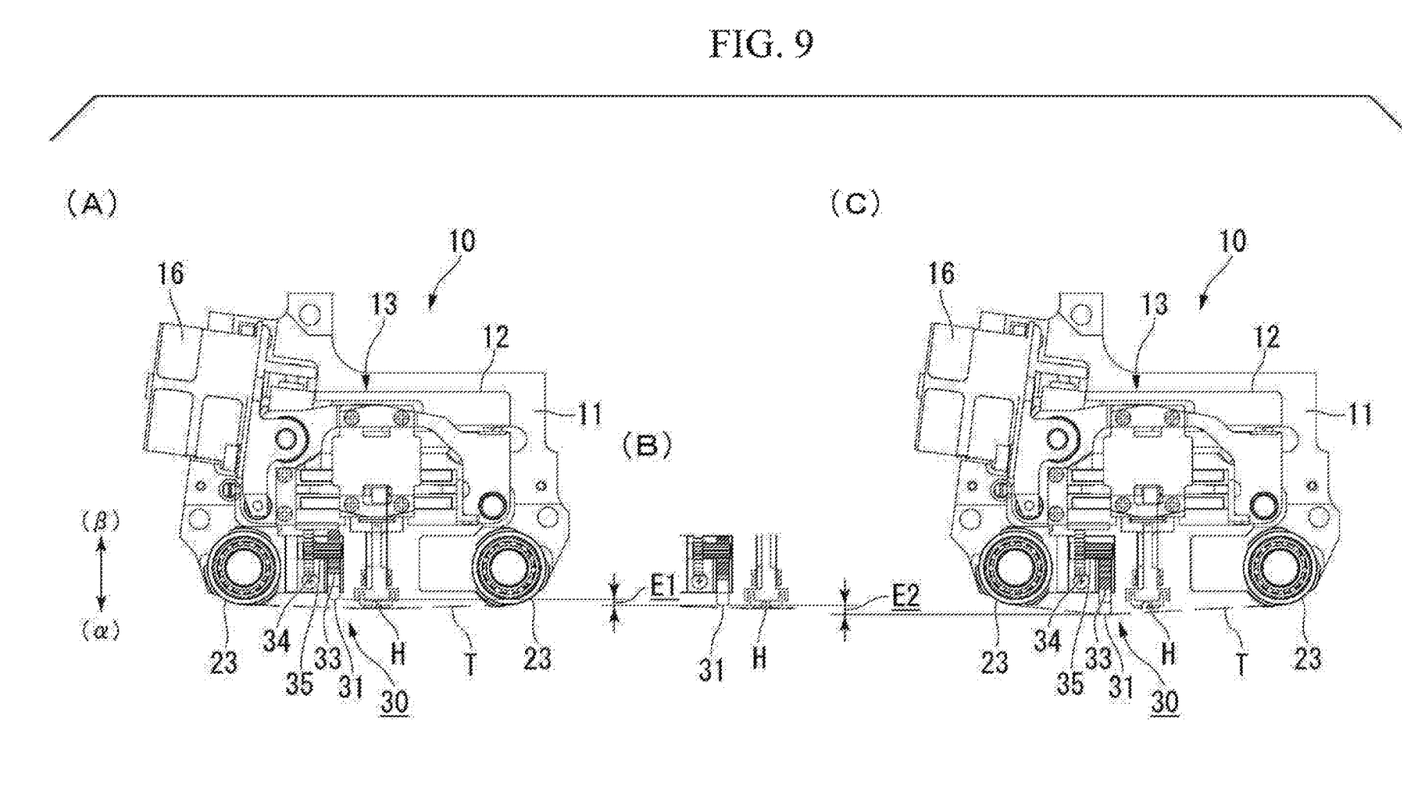
FIG. 9 is a diagram showing positions of the lifter arm of the magnetic tape device according to the second exemplary embodiment.

FIG. 9 shows positions of the lifter arm of the magnetic tape device according to the second exemplary embodiment. The portion (A) of FIG. 9 shows a case where the lifter arm 31 is at the retreat position. The portion (B) of FIG. 9 shows a case where the lifter arm 31 has started to project. The portion (C) of FIG. 9 shows a case where the lifter arm 31 is at the projecting position.

FIG. 8 and FIG. 9 show a reading/writing range E1 and a lifter function range E2. More specifically, FIG. 8 shows the ranges of the reading/writing range E1 and the lifter function range E2 in the upward-downward direction (that is, the movement range of the distal end of the magnetic head H in the upward-downward direction). FIG. 9 shows the ranges of the reading/writing range E1 and the lifter function range E2 in the front-rear direction (that is, the movement range of the lifter arm 31 in the front-rear direction). The reading/writing range E1 indicates the range where the magnetic head H and the magnetic tape T come into contact with each other. That is to say, the reading/writing range E1 indicates the range where the magnetic head H can read from and write to the magnetic tape T. The lifter function range E2 indicates the range where the magnetic head H and the magnetic tape T are not in contact with each other. That is to say, the lifter function range E2 indicates the range where the magnetic head H cannot read from and write to the magnetic tape T.

In the tape lifting mechanism 30 configured as described above, as shown in FIG. 6, and the portion (A) of FIG. 8 and the portion (A) of FIG. 9, the lifter arm 31 retreats to the rear side of the magnetic head H (in the direction of the arrow (β)) in the state where the elevator member 12 of the head actuator 13 has moved in the upward direction (in the direction of the arrow a).

In this state, the lifter arm 31 is separated from the magnetic tape T. Therefore, the magnetic tape T can be brought into contact with the magnetic head H. Therefore, the magnetic head H can read from and write to the magnetic tape T. The movement region of the magnetic head H and the lifter arm 31 at this time is shown by the reading/writing range E1 in FIG. 8 and FIG. 9.

That is to say, when the magnetic head H of the head actuator 13 is at the raised position in the direction of the arrow a, the magnetic head H is in the reading/writing range E1 where it reads from or writes to the magnetic tape T. In this reading/writing range E1, it is possible to move the magnetic head H upward and downward in order to minutely position the magnetic head H with respect to the recording track on the magnetic tape T.

Figure 7:
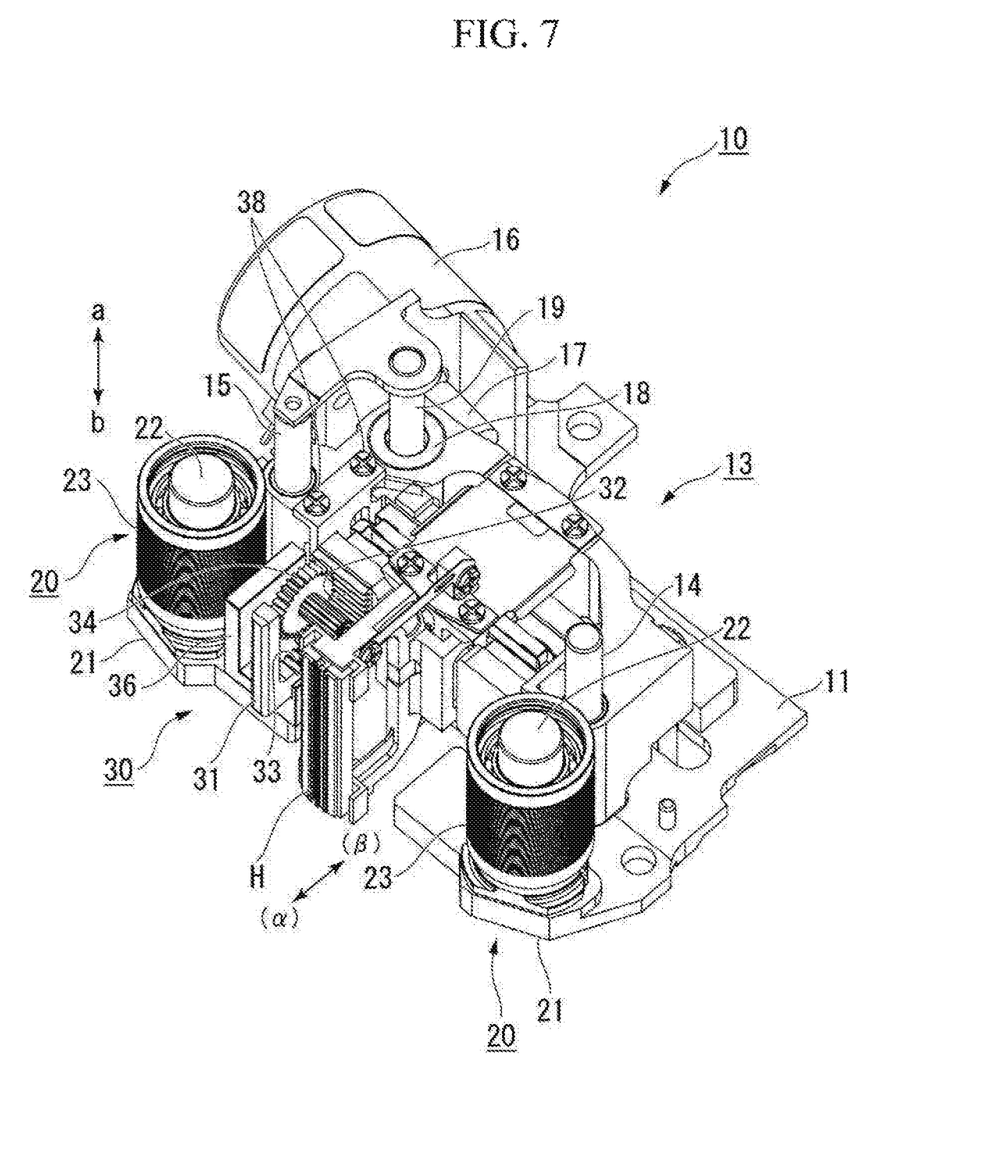
FIG. 7 is a perspective view of the magnetic tape device according to the second exemplary embodiment, showing a state where the lifter arm of the tape lifting mechanism is at a projecting position.

Moreover, in the tape lifting mechanism 30, as shown in FIG. 7, and the portion (C) of FIG. 8, and the portion (C) of FIG. 9, it is possible to cause the lifter arm 31 to move forward of (in the direction of the arrow (α)) the magnetic head H, when the elevator member 12 of the head actuator 13 has moved downward (in the direction of the arrow b) by driving of the lifting motor 16.

Specifically, the driving force of the lifting motor 16 is transmitted to the worm gear 17, and the worm gear 17 rotates to thereby rotate the gear and lead screw 18. As a result, an inner diameter portion of the gear and lead screw 18 is rotated to thereby rotate the lead screw 19 and lower the elevator member 12 of the head actuator 13.

By also moving the first rack 32 downward (in the direction of the arrow b) together with the descent of the elevator member 12 as described above, the pinion 34 engaged with the first rack 32 is rotated. This rotation operation is transmitted to the second rack 33 through the pinion 35, and the second rack 33 moves forward. In this manner, the upward-downward movement of the elevator member 12 is converted into the forward-backward movement of the second rack 33 (in the direction of the arrows (α)-(β)).

As a result, the lifter arm 31 provided integrally with the second rack 33 pushes out the magnetic tape T in the direction of the arrow (α) to separate the magnetic tape T from the magnetic head H. The movement region of the magnetic head H and the lifter arm 31 at this time is shown by the lifter function range E2 in FIG. 8 and FIG. 9.

The intermediate position shown in the portion (B) of FIG. 8 and the portion (B) of FIG. 9 shows a state where the lifter arm 31 is at the same height as the center plane of the magnetic head H in the process of the lifter arm 31 moving forward (in the direction of the arrow (α))).

With this intermediate position serving as a border, when the magnetic head H mounted on the elevator member 12 is in the reading/writing range E1 where it is at the upper position (in the direction of the arrow a) (see the portion (A) of FIG. 8 and the portion (A) of FIG. 9), the lifter arm 31 does not press the magnetic tape T. Therefore, data can be read and written as before.

With the intermediate position serving as a border, when the magnetic head H mounted on the elevator member 12 is in the lifter function range E2 where it is at the lower position (in the direction of the arrow b) (see the portion (C) of FIG. 8 and the portion (C) of FIG. 9), the lifter arm 31 pushes the magnetic tape T, to give a non-contact state between the magnetic head H and magnetic tape T.

Figure 10:
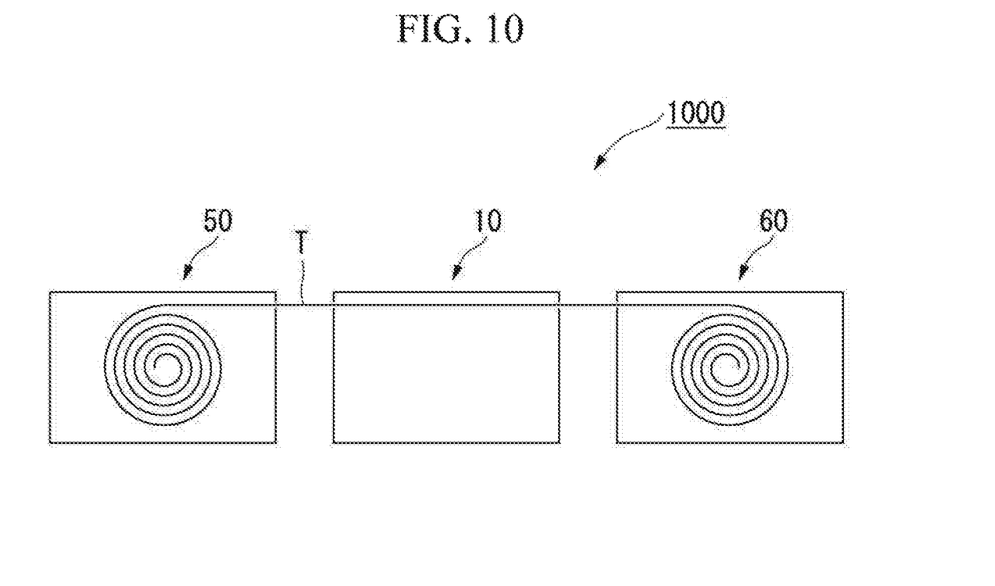
FIG. 10 is a diagram showing a magnetic recording device according to the second exemplary embodiment.

FIG. 10 shows a magnetic recording device 1000. The magnetic recording device 1000 includes: a magnetic tape device 10; a feeding device 50 that feeds out the magnetic tape T to the magnetic tape device 10; and a reeling-up device 60 that reels up the magnetic tape T having passed through the magnetic tape device 10.

As described above in detail, according to the magnetic tape device 10 of the second exemplary embodiment, for example, the power of the head actuator 13 of the related art that moves in the width direction (the direction of the arrows a-b) of the magnetic tape T which is fed out from the upstream side feeding device 50, and passes through the vicinity of the magnetic head H, and is reeled up by the reeling-up device 60, is used to drive the lifter arm 31 to separate the magnetic tape T from the magnetic head H. Therefore, wear of the magnetic tape T can be effectively suppressed without causing complication in the configuration.

Specifically, in the magnetic tape device 10 according to the second exemplary embodiment, it is possible to push out the magnetic tape T to separate the magnetic tape T from the magnetic head H by moving the lifter arm 31 forward (in the direction of the arrow (α) by means of the tape lifting mechanism 30, when the head actuator 13 has moved in one direction (in the direction of the arrow b).

Moreover, in the magnetic tape device 10, when the head actuator 13 has moved in the other direction (in the direction of the arrow a), then by retreating the lifter arm 31 backward (in the direction of the arrow ((3) by means of the tape lifting mechanism 30, it is possible to separate the lifter arm 31 from the magnetic tape T to bring the magnetic tape T into contact with the magnetic head H.

As a result, in the magnetic tape device 10, it is possible, without newly providing a special mechanism for driving the lifter arm 31, to drive the lifter arm 31 using the power of the head actuator 13 of the related art. As a result, wear of the magnetic tape can be effectively suppressed without causing complication in the configuration.

Figure 6:
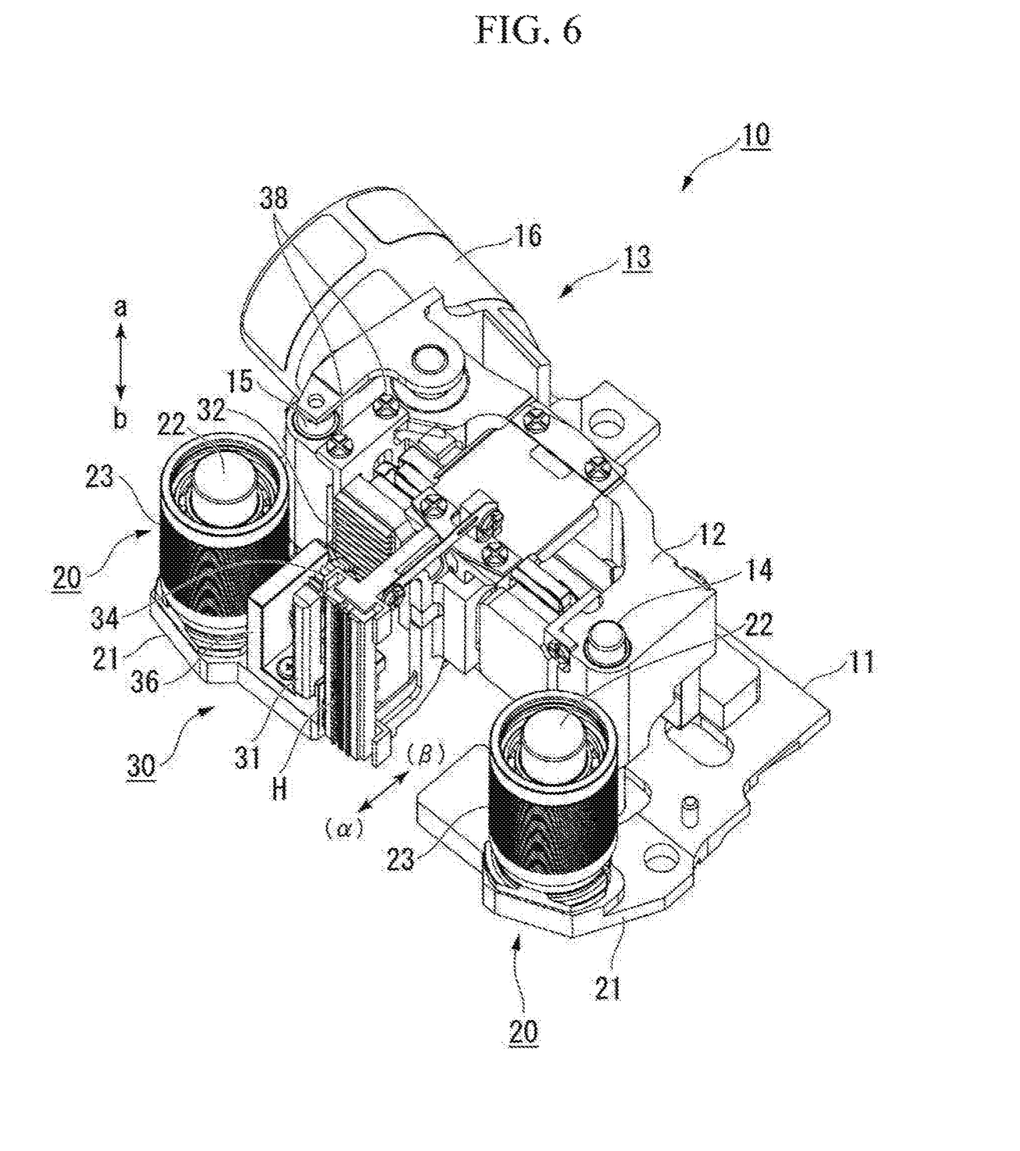
FIG. 6 is a perspective view of the magnetic tape device according to the second exemplary embodiment, showing a state where a lifter arm of the tape lifting mechanism is at a retreat position.

In the above second exemplary embodiment, the tape lifting mechanism 30 is installed on the left side of the magnetic head H in FIG. 6. However, if the right side is more advantageous in terms of tape traveling stability, the tape lifting mechanism 30 may be installed on the right side of the magnetic head H. Also, the configuration is not limited to this, and two sets of tape lifting mechanisms 30 may be installed on both sides of the magnetic head H in order to distribute friction (wear) of the lifter arm 31.

Moreover, in the above second exemplary embodiment, reading or writing is performed with respect to the magnetic tape T when the magnetic head H is at the upper position, and the lifter arm 31 lifts the magnetic tape T when the magnetic head H is at the lower position. However, this may be performed in the reversed manner. That is to say, reading or writing with respect to the magnetic tape T may be performed when the magnetic head H is at the lower position, and the lifter arm 31 may lift the magnetic tape T when the magnetic head H is at the upper position.

The exemplary embodiments of the present invention have been described in detail with reference to the drawings. However, the specific configuration of the invention is not limited to the exemplary embodiments, and design changes and the like within the scope of the present invention are also included.

Priority is claimed on Japanese Patent Application No. 2017-018124, filed Feb. 3, 2017, the entire contents of which are incorporated herein by reference.

INDUSTRIAL APPLICABILITY

The present invention relates to a magnetic tape device, a recording device using a magnetic tape, and a tape lifting method for a magnetic tape device, capable of lifting a magnetic tape with a simple configuration.

REFERENCE SYMBOLS

1 Base
2 Elevator member
3 Head actuator
4 Lifting motor
5 Lifter arm
6 Tape lifting mechanism
10 Magnetic tape device
11 Body base
12 Elevator member
13 Head actuator
16 Lifting motor
30 Tape lifting mechanism
31 Lifter arm
32 First rack
33 Second rack
34 Pinion
35 Pinion
100 Magnetic tape device

What is claimed is:

1. A magnetic tape device comprising:
a magnetic head that comes into contact with a magnetic tape that travels;
a head actuator that holds the magnetic head and moves in a first direction and a second direction, the first direction and the second direction being along a width direction of the magnetic tape, and the second direction being opposite to the first direction; and
a tape lifting mechanism that comprises a lifter arm, the lifter arm coming into contact with the magnetic tape to separate the magnetic tape from the magnetic head, the tape lifting mechanism moving the lifter arm in a push-out direction using a driving force of the head actuator in conjunction with the head actuator moving in the first direction, the tape lifting mechanism moving the lifter arm in a retreating direction using the driving force of the head actuator in conjunction with the head actuator moving in the second direction, the retreating direction being opposite to the push-out direction,
wherein the lifter arm pushes out the magnetic tape to separate the magnetic tape from the magnetic head, in response to the lifter arm moving in the push-out direction, and
the lifter arm separates from the magnetic tape to bring the magnetic tape into contact with the magnetic head, in response to the lifter arm moving in the retreating direction.

2. The magnetic tape device according to claim 1,
wherein the tape lifting mechanism comprises:
a first rack fixed to the head actuator;
a second rack fixed to the lifter arm; and
a pinion that is provided between the first and second racks, is meshed with the first and second racks, and changes a direction of the driving force of the head actuator and transfers the driving force to the lifter arm, and
the pinion is rotatably supported.

3. The magnetic tape device according to claim 2, wherein an axis of a shaft of the head actuator and a rotation axis of the pinion are orthogonal to each other.

4. The magnetic tape device according to claim 2,
wherein the pinion comprises a first pinion meshed with the first rack and a second pinion meshed with the second rack, and
the first pinion and the second pinion rotate integrally about a same rotation axis.

5. The magnetic tape device according to claim 1,
wherein the head actuator is movable in an upward direction and a downward direction, the upward direction and the downward direction being along the width direction of the magnetic tape,
the lifter arm moves forward in conjunction with the head actuator moving in the downward direction, and
the lifter arm retracts rearward in conjunction with the head actuator moving in the upward direction.

6. The magnetic tape device according to claim 1, wherein the tape lift mechanism is provided at one place on one side of the magnetic head.

7. The magnetic tape device according to claim 1, wherein the tape lift mechanism is provided on both sides of the magnetic head.

8. A magnetic recording device comprising:
the magnetic tape device according to claim 1;
a feeding device that feeds out the magnetic tape to the magnetic tape device; and
a reeling-up device that reels up the magnetic tape having passed through the magnetic tape device.

9. The magnetic recording device according to claim 8, wherein the lifter arm is formed of a low friction material.

10. A tape lifting method for a magnetic tape device, the magnetic tape device comprising a magnetic head that comes into contact with a magnetic tape that travels, a head actuator that holds the magnetic head and moves in a first direction and a second direction, and a tape lifting mechanism comprising a lifter arm that comes into contact with the magnetic tape to separate the magnetic tape from the magnetic head, the first direction and the second direction being along a width direction of the magnetic tape, and the second direction being opposite to the first direction, the method comprising:
moving the lifter arm in a push-out direction using a driving force of the head actuator in conjunction with the head actuator moving in the first direction;
separating the magnetic tape from the magnetic head by the lifter arm pushing out the magnetic tape in response to the lifter arm moving in the push-out direction;

moving the lifter arm in a retreating direction using the driving force of the head actuator in conjunction with the head actuator moving in the second direction, the retreating direction being opposite to the push-out direction; and bringing the magnetic tape into contact with the magnetic head by the lifter arm separating from the magnetic tape in response to the lifter arm moving in the retreating direction.

* * * * *